(12) United States Patent
Lee et al.

(10) Patent No.: US 12,215,403 B2
(45) Date of Patent: Feb. 4, 2025

(54) NON-ORIENTED ELECTRICAL STEEL SHEET AND METHOD FOR MANUFACTURING SAME

(71) Applicant: POSCO, Pohang-si (KR)

(72) Inventors: Hunju Lee, Pohang-si (KR); Jae-Hoon Kim, Pohang-si (KR); Seung-Gon Lee, Pohang-si (KR); Seung Il Kim, Pohang-si (KR)

(73) Assignee: POSCO, Pohang-si (KR)

( * ) Notice: Subject to any disclaimer, the term of this patent is extended or adjusted under 35 U.S.C. 154(b) by 217 days.

(21) Appl. No.: 17/787,023

(22) PCT Filed: Dec. 9, 2020

(86) PCT No.: PCT/KR2020/017976
§ 371 (c)(1),
(2) Date: Jun. 17, 2022

(87) PCT Pub. No.: WO2021/125683
PCT Pub. Date: Jun. 24, 2021

(65) Prior Publication Data
US 2023/0021153 A1    Jan. 19, 2023

(30) Foreign Application Priority Data

Dec. 20, 2019 (KR) .................. 10-2019-0171449

(51) Int. Cl.
*C22C 38/50*    (2006.01)
*C21D 6/00*    (2006.01)
(Continued)

(52) U.S. Cl.
CPC .............. *C21D 9/46* (2013.01); *C21D 6/004* (2013.01); *C21D 6/005* (2013.01); *C21D 6/008* (2013.01);
(Continued)

(58) Field of Classification Search
CPC ...... C21D 9/46; C21D 8/1222; C21D 8/1233; C22C 38/002; C22C 38/008; C22C 38/04; C22C 38/06; C22C 38/34; H01F 1/16
See application file for complete search history.

(56) References Cited

U.S. PATENT DOCUMENTS

2009/0202383 A1* 8/2009 Tanaka .................. C22C 38/004
                                                                148/624
2012/0014828 A1    1/2012 Miyazaki et al.
(Continued)

FOREIGN PATENT DOCUMENTS

CA        2971682 A    8/2020
CN        1887512 A    1/2007
(Continued)

OTHER PUBLICATIONS

Chinese Office Action dated Feb. 15, 2023 issued in Chinese Patent Application No. 202080094662.3.
(Continued)

*Primary Examiner* — Maria V Ewald
*Assistant Examiner* — Donald M Flores, Jr.
(74) *Attorney, Agent, or Firm* — Morgan, Lewis & Bockius LLP (57) ABSTRACT

A non-oriented electrical steel sheet according to an embodiment of the present invention includes, in wt %, Si: 1.5 to 4.0%, Al: 0.1 to 1.5%, Mn: 0.05 to 1.5%, Sn: 0.015 to 0.1%, P: 0.005 to 0.05%, Ga: 0.001 to 0.004%, and Bi: 0.0005 to 0.003%, and the balance of Fe and inevitable impurities. An area fraction of texture in a {118}//ND orientation is higher than that of texture in a {111}//ND orientation.

14 Claims, 1 Drawing Sheet

(51) Int. Cl.
  *C21D 8/00* (2006.01)
  *C21D 8/12* (2006.01)
  *C21D 9/46* (2006.01)
  *C22C 38/00* (2006.01)
  *C22C 38/04* (2006.01)
  *C22C 38/06* (2006.01)
  *C22C 38/34* (2006.01)
  *C22C 38/44* (2006.01)
  *H01F 1/16* (2006.01)

(52) U.S. Cl.
  CPC ........... *C21D 8/005* (2013.01); *C21D 8/1222* (2013.01); *C21D 8/1233* (2013.01); *C21D 8/1272* (2013.01); *C22C 38/001* (2013.01); *C22C 38/002* (2013.01); *C22C 38/008* (2013.01); *C22C 38/04* (2013.01); *C22C 38/06* (2013.01); *C22C 38/34* (2013.01); *C22C 38/44* (2013.01); *C22C 38/50* (2013.01); *H01F 1/16* (2013.01); *C22C 2202/02* (2013.01)

(56) References Cited

U.S. PATENT DOCUMENTS

| 2015/0348686 | A1 | 12/2015 | Toda et al. |
| 2016/0076125 | A1 | 3/2016 | Koseki et al. |
| 2017/0241002 | A1 | 8/2017 | Nakajima et al. |
| 2020/0080175 | A1* | 3/2020 | Kim .................. C22C 38/004 |

FOREIGN PATENT DOCUMENTS

| CN | 110073021 A | 7/2019 |
| CN | 110088319 A | 8/2019 |
| JP | 2658660 B2 | 9/1997 |
| JP | 2000-017334 A | 1/2000 |
| JP | 2006-241563 A | 9/2006 |
| JP | 2007-16278 A | 1/2007 |
| JP | 2007-031793 A | 2/2007 |
| JP | 2011-084761 A | 4/2011 |
| JP | 2019-183185 A | 10/2019 |
| KR | 10-2008-0027913 A | 3/2008 |
| KR | 10-1037159 B1 | 5/2011 |
| KR | 10-2015-0109485 A | 10/2015 |
| KR | 10-2018-0070949 A | 6/2018 |
| KR | 10-1902438 B1 | 9/2018 |
| KR | 10-2019-0077890 A | 7/2019 |
| KR | 10-2019-0078155 A | 7/2019 |
| KR | 10-2019-0078251 A | 7/2019 |
| KR | 10-2019-0078395 A | 7/2019 |
| KR | 10-2009393 B1 | 8/2019 |
| WO | 2018/117598 A1 | 6/2018 |
| WO | 2019/132129 A1 | 7/2019 |
| WO | 2019/132426 A1 | 7/2019 |

OTHER PUBLICATIONS

International Search Report and Written Opinion issued in corresponding International Application No. PCT/KR2020/017976 dated May 26, 2021.
Japanese Office Action dated Sep. 19, 2023 issued in Japanese Patent Application No. 2022-537548.
Extended European Search Report dated Apr. 26, 2023 issued in European Patent Application No. 20901855.5.
Notice of Allowance issued Apr. 12, 2024 for Chinese Patent Application No. 202080094662.3.

* cited by examiner

FIG. 1

NON-ORIENTED ELECTRICAL STEEL SHEET AND METHOD FOR MANUFACTURING SAME

CROSS-REFERENCE OF RELATED APPLICATIONS

This application is the U.S. National Phase under 35 U.S.C. § 371 of International Patent Application No. PCT/KR2020/017976, filed on Dec. 9, 2020, which in turn claims the benefit of Korean Application No. 10-2019-0171449, filed on Dec. 20, 2019, the entire disclosures of which applications are incorporated by reference herein.

TECHNICAL FIELD

An embodiment of the present invention relates to a non-oriented electrical steel sheet and a manufacturing method thereof. Specifically, an embodiment of the present invention relates to a non-oriented electrical steel sheet and a manufacturing method thereof that may improve magnetism by appropriately adding Sn, P, Ga, and Bi, and improving texture.

BACKGROUND ART

A non-oriented electrical steel sheet is mainly used in a motor that convert electrical energy to mechanical energy, and an excellent magnetic characteristic of the non-oriented electrical steel sheet is required to achieve high efficiency while the motor converts the electrical energy to the mechanical energy. Recently, as environmentally-friendly technology has been highlighted, it is very important to increase efficiency of the motor using about half of the total electrical energy, and for this, the non-oriented electrical steel sheet with an excellent magnetic characteristic also increases. The magnetic characteristic of the non-oriented electrical steel are mainly evaluated by iron loss and magnetic flux density. The iron loss means energy loss occurring at a specific magnetic flux density and frequency, and the magnetic flux density means a degree of magnetization obtained in a specific magnetic field. As the core loss decreases, a more energy efficient motor may be manufactured in the same condition, and as the magnetic flux density is higher, it is possible to downsize the motor and to reduce copper loss, thus it is important to manufacture the non-oriented electrical steel sheet having low iron loss and high magnetic flux density. Depending on operational conditions of the motor, the characteristics of the non-oriented electrical steel sheet that should be considered is also varied. As a reference for evaluating the characteristics of the non-oriented electrical steel sheet used in the motor, many motors regard W15/50, which is iron loss when a magnetic field of 1.5 T is applied at a commercial frequency of 50 Hz, as the most important value. However, all motors used for various purposes do not value the iron loss of W15/50 as the most important, and they also estimate iron loss at other frequencies or applied magnetic fields according to a main operational condition. Particularly, in the non-oriented electrical steel sheet that has recently been used in a motor for driving an electric car, there are many cases in which the magnetic characteristic is important in a low magnetic field of 1.0 T or less and a high frequency of 400 Hz or more, so the characteristic of the non-oriented electrical steel sheet is estimated with an iron loss such as W10/400. A typically used method for increasing the magnetic properties of the non-oriented electrical steel sheet is to add an alloying element such as Si. The addition of the alloying element can increase specific resistance of the steel, and as the specific resistance is higher, eddy current loss decreases, thereby reducing the total iron loss. On the contrary, as the content of Si increases, the magnetic flux density is deteriorated and brittleness increases, and when more than a predetermined amount thereof is added, it may not be cold rolled and may not be able to be commercially produced. Particularly, the electrical steel sheet may obtain the effect of reducing the iron loss as it becomes thinner, but the deterioration of rolling by the brittleness is a serious problem. Elements such as Al and Mn are added to further increase the specific resistance of the steel to produce the highest grade non-oriented electrical steel sheet with excellent magnetic properties. For the non-oriented electrical steel sheet used for the motor for driving the electric vehicle, high-frequency iron loss of 400 Hz or higher is important, and in this case, the higher the frequency, the higher a ratio of eddy current loss to iron loss, so that it is advantageous to increase specific resistance thereof and decrease a thickness thereof. However, as the thickness of the steel sheet decreases, a cold reduction ratio thereof increases, so that a $\{111\}$//ND texture develops and causes the magnetism to deteriorate, and when the cold reduction ratio is reduced by decreasing the thickness of the hot-rolled sheet to improve this, in the cold rolling process, a shape of the steel sheet may not be sufficiently controlled, and a width direction thickness deviation increases, thereby causing dimensional defects of a motor core. In addition, as the thickness of the steel sheet increases, a length of a coil thereof increases, which increases a working time of a continuous annealing process, causing a problem of lowering annealing productivity. In order to solve the above-described problems, attempts have been made to make ultra-clean steel by sufficiently removing impurities in a steelmaking process or to improve magnetism by reducing inclusions and precipitates in the steel by adding specific elements, but this has limitations in practical application due to the limitations of commercial production conditions. In addition, a method for improving the texture by controlling the annealing temperature or atmosphere and controlling the strain rate of the steel sheet during rolling has been proposed, but due to increased manufacturing cost, decreased productivity, and ineffectiveness, technologies used in practice are extremely limited.

DISCLOSURE

Description of the Drawings

Technical Problem

An embodiment of the present invention is to provide a non-oriented electrical steel sheet and a manufacturing method thereof. Specifically, an embodiment of the present invention provides a non-oriented electrical steel sheet and a manufacturing method thereof that may improve magnetism by appropriately adding Sn, P, Ga, and Bi, and improving texture.

Technical Solution

A non-oriented electrical steel sheet according to an embodiment of the present invention includes, in wt %, Si: 1.5 to 4.0%, Al: 0.1 to 1.5%, Mn: 0.05 to 1.5%, Sn: 0.015 to 0.1%, P: 0.005 to 0.05%, Ga: 0.001 to 0.004%, and Bi: 0.0005 to 0.003%, and the balance of Fe and inevitable impurities.

A fraction of texture in a {118}//ND orientation is higher than that of texture in a {111}//ND orientation.

The non-oriented electrical steel sheet according to the embodiment of the present invention may further include Cr: 0.005 to 0.03 wt %, and may satisfy Formula 1 below.

$$0.005 \leq [Cr] \leq 0.03 \times [Al] \quad \text{[Formula 1]}$$

(In Formula 1, [Cr] and [Al] are a content (wt %) of Cr and Al in the steel sheet, respectively).

The non-oriented electrical steel sheet according to the embodiment of the present invention may further include Mo: 0.001 to 0.01 wt % and Ni: 0.005 to 0.04 wt %, and may satisfy Formula 2 below.

$$10 \times [Mo] \leq ([Sn]+[P]) \leq 4 \times [Ni] \quad \text{[Formula 2]}$$

(In Formula 2, [Mo], [Sn], [P], and [Ni] represent a content (wt %) of Mo, Sn, P, and Ni in the steel sheet, respectively).

The non-oriented electrical steel sheet according to the embodiment of the present invention may further include Cu: 0.001 to 0.05 wt %, S: 0.005 wt % or less, and Ti: 0.005 wt % or less, and may satisfy Formula 3 below.

$$0.5 \leq [Cu]/([Ti]+[S]) \leq 7.5 \quad \text{[Formula 3]}$$

(In Formula 3, [Cu], [Ti], and [S] represent a content (wt %) of Cu, Ti, and S in the steel sheet, respectively).

The non-oriented electrical steel sheet according to the embodiment of the present invention may further include C: 0.005 wt % or less and N: 0.005 wt % or less.

An oxide layer may be present in an inner direction from a surface of the electrical steel sheet, and a thickness of the oxide layer may be 10 to 50 nm.

The oxide layer may include O: 40 to 70 wt %, Al: 25 to 55 wt %, P: 0.01 to 0.1 wt %, and Sn: 0.01 to 0.1 wt %, and the balance of Fe and inevitable impurities.

An average grain size may be 50 to 100 μm.

Among sulfides formed inside a base material, the number of sulfides with a diameter of 100 nm or more may satisfy three or more times the number of sulfides of less than 100 nm.

A thickness thereof may be 0.10 to 0.30 mm.

A difference between a thickness ($t_{center}$) of a center in a width direction of the steel sheet and a thickness ($t_{500}$) at a position away from 500 mm vertically from the center to an edge may be 10 μm or less.

A manufacturing method of a non-oriented electrical steel sheet according to an embodiment of the present invention includes: hot-rolling a slab including, in wt %, Si: 1.5 to 4.0%, Al: 0.1 to 1.5%, Mn: 0.05 to 1.5%, Sn: 0.015 to 0.1%, P: 0.005 to 0.05%, Ga: 0.001 to 0.004%, and Bi: 0.0005 to 0.003%, and the balance of Fe and inevitable impurities, to manufacture a hot-rolled sheet; cold-rolling the hot-rolled sheet at a reduction ratio of 85% or more to manufacture a cold-rolled sheet; and final annealing the cold-rolled sheet.

After the manufacturing of the hot-rolled sheet, annealing the hot-rolled sheet at a temperature of 850 to 1150° C. may be further included.

The final annealing may be performed in 100 seconds or less in an atmosphere including hydrogen ($H_2$) and nitrogen ($N_2$) and at a temperature ranging from 400 to 1000° C.

Advantageous Effects

According to the embodiment of the present invention, by providing an optimum alloy composition of a non-oriented electrical steel sheet, it is possible to manufacture a non-oriented electrical steel sheet that is excellent in magnetism, shape, and productivity with a low thickness deviation in a width direction of a steel sheet.

In addition, according to the embodiment of the present invention, it is possible to improve efficiency of an electric vehicle driving motor by using a non-oriented electrical steel sheet with excellent magnetic properties.

MODE FOR INVENTION

It will be understood that, although the terms first, second, third, etc. may be used herein to describe various elements, components, regions, areas, zones, layers, and/or sections, they are not limited thereto. These terms are only used to distinguish one element, component, region, area, zone, layer, or section from another element, component, region, layer, or section. Therefore, a first part, component, region, area, zone, layer, or section to be described below may be referred to as second part, component, area, layer, or section within the range of the present invention.

The technical terms used herein are to simply mention a particular embodiment and are not meant to limit the present invention. An expression used in the singular encompasses an expression of the plural, unless it has a clearly different meaning in the context. In the specification, it is to be understood that the terms such as "including", "having", etc., are intended to indicate the existence of specific features, regions, numbers, stages, operations, elements, components, and/or combinations thereof disclosed in the specification, and are not intended to preclude the possibility that one or more other features, regions, numbers, stages, operations, elements, components, and/or combinations thereof may exist or may be added.

When referring to a part as being "on" or "above" another part, it may be positioned directly on or above the other part, or another part may be interposed therebetween. In contrast, when referring to a part being "directly above" another part, no other part is interposed therebetween.

Unless otherwise stated, % means wt %, and 1 ppm is 0.0001 wt %.

In embodiments of the present invention, inclusion of an additional element means replacing the balance of iron (Fe) by an additional amount of the additional elements.

Unless otherwise defined, all terms used herein, including technical or scientific terms, have the same meanings as those generally understood by those with ordinary knowledge in the field of art to which the present invention belongs. Terms defined in commonly used dictionaries are further interpreted as having meanings consistent with the relevant technical literature and the present disclosure, and are not to be construed as having idealized or very formal meanings unless defined otherwise.

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

A non-oriented electrical steel sheet according to an embodiment of the present invention includes: in wt %, Si: 1.5 to 4.0%, Al: 0.1 to 1.5%, Mn: 0.05 to 1.5%, Sn: 0.015 to 0.1%, P: 0.005 to 0.05%, Ga: 0.001 to 0.004%, and Bi: 0.0005 to 0.003%, and the balance of Fe and inevitable impurities.

Hereinafter, the reason for limiting the components of the non-oriented electrical steel sheet will be described.

Si: 1.5 to 4.0 wt %

Silicon (Si) serves to increase specific resistance of a material to decrease iron loss. When too little Si is added, an effect of improving the iron loss may be insufficient. When too much Si is added, brittleness of the material increases, and rolling productivity is rapidly deteriorated, and an oxide layer and an oxide on a surface that are harmful to magnetism may be formed. Accordingly, Si may be included in an amount of 1.5 to 4.0 wt %. Specifically, it may be included in an amount of 2.0 to 3.9 wt %. More specifically, it may be included in an amount of 3.2 to 3.7 wt %.

Al: 0.1 to 1.5 wt %

Aluminum (Al) serves to increase specific resistance of a material to decrease iron loss. When too little Al is added, it may be difficult to obtain a magnetic improvement effect because fine nitrides are formed or a surface oxide layer is not densely formed. When too much Al is added, nitrides are excessively formed, deteriorating the magnetism, and causing problems in all processes such as steel making and continuous casting, which may considerably reduce productivity. Accordingly, Al may be included in an amount of 0.1 to 1.5 wt %. Specifically, it may be included in an amount of 0.3 to 1.0 wt %.

Mn: 0.05 to 1.50 wt %

Manganese (Mn) improves the iron loss by increasing the specific resistance of the material and serves to form a sulfide. When too little Mn is added, the sulfide is finely formed, causing magnetic deterioration, and when too much Mn is added, fine MnS is excessively precipitated and the formation of a {111} texture unfavorable to magnetism is promoted, resulting in a rapid decrease in magnetic flux density. Accordingly, Mn may be included in an amount of 0.05 to 1.50 wt %. Specifically, it may be included in an amount of 0.1 to 1.0 wt %.

Sn at 0.015 to 0.100 wt %

Tin (Sn) serves to be segregated on the surface and grain boundaries of the steel sheet to suppress surface oxidation during annealing, serves to prevent the diffusion of elements through the grain boundaries, and serves to prevents the recrystallization of the {111}//ND orientation to improve the texture. When too little Sn is added, the above-described effect may not be sufficiently obtained. When too much Sn is added, toughness deteriorates due to an increase in the amount of grain boundary segregation, so that productivity may deteriorate compared to magnetic improvement. Accordingly, Sn may be included in an amount of 0.015 to 0.100 wt %. Specifically, it may be included in an amount of 0.020 to 0.075 wt %.

P: 0.005 to 0.050 wt %

Phosphorus (P) serves to be segregated on the surface and grain boundaries of the steel sheet to suppress surface oxidation during annealing, serves to prevent the diffusion of elements through the grain boundaries, and serves to prevents the recrystallization of the {111}//ND orientation to improve the texture. When too little P is added, an effect thereof may not be sufficiently obtained. When too much P is added, a hot working characteristic deteriorates, so that productivity may deteriorate compared to magnetic improvement. Accordingly, P may be included in an amount of 0.005 to 0.050 wt %. Specifically, P may be included in an amount of 0.007 to 0.045 wt %.

Ga: 0.001 to 0.004 wt %

Although gallium (Ga) is not strongly segregated on the surface and grain boundaries, it may maximize an effect of improving texture during recrystallization annealing by promoting segregation of Sn and P when it is added in a small amount, and it is easy to control a shape of the steel sheet by increasing ductility of the steel. When too little Ga is added, an effect thereof may not be sufficiently obtained. When too much Ga is added, it may cause defects on the surface of the steel sheet to deteriorate the magnetism. Accordingly, Ga may be included in an amount of 0.001 to 0.0040 wt %. Specifically, Ga may be included in an amount of 0.0015 to 0.0035 wt %.

Bi: 0.0005 to 0.003%

Bismuth (Bi) serves to promote grain boundaries and grain boundary segregation of Sn and P and to reduce deformation resistance during rolling. When too little Bi is added, an effect thereof may not be sufficiently obtained. When too much Bi is added, the magnetism may be rather deteriorated. Accordingly, Bi may be included in an amount of 0.0005 to 0.0030 wt %. Specifically, Ga may be included in an amount of 0.0010 to 0.0030 wt %.

The non-oriented electrical steel sheet according to the embodiment of the present invention further includes Cr at 0.005 to 0.03 wt %.

Cr: 0.005 to 0.03 wt %

Although chromium (Cr) does not have a strong tendency to form fine precipitates, it may interfere with formation of an Al-based oxide layer on the surface layer and may deteriorate magnetism by forming a Cr-based carbide. When too little Cr is added, an Al oxide layer may be formed too thickly or an oxide or nitride of a round shape may be formed on the surface to deteriorate magnetism, and when too much Cr is added, it is difficult to form a dense oxide layer, so that the magnetism may deteriorate. Accordingly, when Cr is further included, it may be included in an amount of 0.005 to 0.03 wt %.

Specifically, Cr may satisfy Formula 1 below.

$$0.005 \leq [Cr] \leq 0.03 \times [Al] \qquad \text{[Formula 1]}$$

(In Formula 1, [Cr] and [Al] are contents (wt %) of Cr and Al in the steel sheet, respectively).

By controlling an upper limit of Cr in conjunction with Al, a dense oxide layer may be formed.

The non-oriented electrical steel sheet according to the embodiment of the present invention may further include Mo at 0.001 to 0.01 wt % and Ni at 0.005 to 0.04 wt %.

Mo: 0.001 to 0.01 wt %

Molybdenum (Mo) serves to improve the texture by segregation at the surface and grain boundaries. When too little Mo is added, a {111} texture may develop and the magnetism may deteriorate. When too much Mo is added, an effect of improving the texture may be reduced by suppressing segregation of Sn and P. Accordingly, when Mo is further included, it may be included in an amount of 0.001 to 0.01 wt %.

Ni: 0.005 to 0.04 wt %

Nickel (Ni) serves to increase the ductility of steel and promote segregation of Sn and P. When too much Ni is added, the magnetic flux density may rapidly decrease. Accordingly, when Ni is further included, it may be included in an amount of 0.005 to 0.04 wt %.

Specifically, Ni and Mo may satisfy Formula 2 below.

$$10 \times [Mo] \leq ([Sn]+[P]) \leq 4 \times [Ni] \qquad \text{[Formula 2]}$$

(In Formula 2, [Mo], [Sn], [P], and [Ni] represent the contents (wt %) of Mo, Sn, P, and Ni in the steel sheet, respectively).

As shown in Formula 2, by controlling the addition amount of Mo and Ni according to the content of Sn and P, the effect of improving the texture by grain boundary segregation of Sn and P may be maximized.

The non-oriented electrical steel sheet according to the embodiment of the present invention may further include Cu: 0.001 to 0.05 wt %, S: 0.005 wt % or less, and Ti: 0.005 wt % or less, and may satisfy Formula 3 below.

Cu: 0.001 to 0.05 wt %

Copper (Cu) is an element capable of forming a sulfide at a high temperature, and when added in a large amount, it is an element that causes surface defects during slab manufacturing. When it is added in an appropriate amount, it has the effect of improving the magnetism by coarsening a CuS or MnCuS precipitate of a fine size. Accordingly, when Cu is included, it may be included in an amount of 0.001 to 0.05 wt %.

S: 0.005 wt % or Less

Sulfur (S) forms MnS, CuS, and (Mn, Cu)S that are fine precipitates to deteriorate magnetic properties and deteriorate hot workability, so it is better to maintain it at a small amount. Accordingly, when S is further included, it may be included in an amount of 0.005 wt % or less. Specifically, it may be included in an amount of 0.0001 to 0.005 wt %. More specifically, it may be included in an amount of 0.0005 to 0.0035 wt %.

Ti: 0.005 wt % or Less

Ti has a very strong tendency to form a precipitate in the steel, and forms a fine carbide, nitride, or sulfide inside the base metal to inhibit crystal grain growth, thereby deteriorating iron loss. Accordingly, the content of Ti should be managed to be 0.004 wt % or less, and more preferably, 0.002 wt % or less.

Cu, Ti, and S may satisfy Formula 3 below.

$$0.5 \leq [Cu]/([Ti]+[S]) \leq 7.5 \quad \text{[Formula 3]}$$

(In Formula 3, [Cu], [Ti], and [S] represent the content (wt %) of Cu, Ti, and S in the steel sheet, respectively).

By controlling the addition amount of Cu, Ti, and S as shown in Formula 3, high-frequency iron loss may be improved by increasing a fraction of a coarse sulfide compared to a fine sulfide.

The non-oriented electrical steel sheet according to the embodiment of the present invention may further include C: 0.005 wt % or less and N: 0.005 wt % or less.

C: 0.005 wt % or Less

Since carbon (C) causes magnetic aging and combines with other impurity elements to form carbides to reduce magnetic characteristics, the less it is, the more preferable it is, and it may be included in an amount of 0.005 wt % or less and more preferably 0.003 wt %.

N: 0.005 wt % or Less

Nitrogen (N) not only forms a fine AlN precipitate inside the base material, but also forms fine precipitates by combining with other impurities to suppress grain growth and worsen iron loss, so that the less it is, the more preferable it is, and it may be managed at 0.005 wt % or less and more preferably at 0.003 wt % or less.

The balance of Fe, and inevitable impurities are included. The inevitable impurities are impurities mixed in the steelmaking and the manufacturing process of the grain-oriented electrical steel sheet, which are widely known in the field, and thus a detailed description thereof will be omitted. In the embodiment of the present invention, the addition of elements other than the above-described alloy components is not excluded, and various elements may be included within a range that does not hinder the technical concept of the present invention. When the additional elements are further included, they replace the balance of Fe.

As the inevitable impurities, there may be, for example, B, Mg, and Zr, and B may be managed to 0.002 wt % or less, Mg may be managed to 0.005 wt % or less, and Zr may be managed to 0.005 wt % or less.

Figure 1:
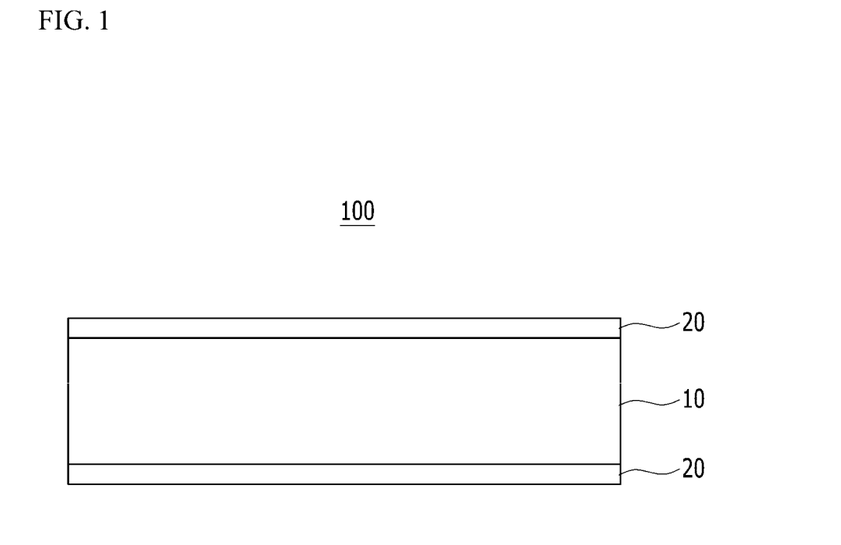
FIG. 1 illustrates a schematic view of a cross-section of a non-oriented electrical steel sheet according to an embodiment of the present invention.

FIG. 1 illustrates a view of a cross-section of a non-oriented electrical steel sheet according to an embodiment of the present invention. As shown in FIG. 1, an oxide layer 20 is present in an inner direction from a surface of an electrical steel sheet 100. The electrical steel sheet 100 excluding the oxide layer 20 is classified as an electrical steel sheet base material 10.

As the electrical steel sheet 100 is exposed to oxygen in the manufacturing process, oxygen in the atmosphere penetrates into the steel sheet, and an oxygen concentration gradient may exist from the surface to the inner direction.

The oxide layer 20 and the base material 10 may be divided into an oxide layer 20 having an oxygen content of 40 wt % or more and a base material 10 having an oxygen content of less than 40 wt %. A thickness of the divided oxide layer 20 may be 10 to 50 nm. By forming the oxide layer 20 having an appropriate thickness as described above, the diffusion of nitrogen in the atmosphere to the base material during annealing is suppressed, thereby suppressing the formation of fine nitrides, and thus the magnetism may be improved. The thickness of the oxide layer 20 on the entire surface of the steel sheet may vary, and in the embodiment of the present invention, the thickness of the oxide layer 20 means an average thickness within the steel sheet.

The oxide layer 20 includes a large amount of Al, Sn, and P concentrated by diffusion from the base material 10 in addition to oxygen present due to the penetration of oxygen in the manufacturing process. Specifically, the oxide layer 20 may include O: 40 to 70 wt %, Al: 25 to 55 wt %, P: 0.01 to 0.1 wt %, and Sn: 0.01 to 0.1 wt %, and the balance of Fe and inevitable impurities. As described above, the oxide layer with the concentrated Al, P, and Sn is formed, thereby suppressing the formation of a round oxide or fine nitride inside the base material, and thus it is possible to improve the magnetism. Similar to O, in the case of P and Sn, a concentration gradient may exist from the base material to the surface direction, and the above-described range means an average content in the oxide layer 20.

In the embodiment of the present invention, an area fraction of texture in a {118}//ND orientation may be larger than an area fraction in texture in a {111}//ND orientation. The texture of the {118}//ND orientation means texture in which a {118} plane is parallel to a rolling plane (ND plane) of the steel sheet within 5°. The texture of the {111}//ND orientation means texture in which a {111} plane is parallel to a rolling plane (ND plane) of the steel sheet within 5°. The area fraction may be measured based on a plane parallel to the rolling plane (ND plane), and may be measured within the base material 10.

Generally, as the cold reduction ratio increases, the texture of the {111}//ND orientation that is harmful to magnetism increases, so that the {118}//ND orientation decreases, and the magnetism deteriorates, but in the present invention, even at a high cold reduction ratio of 85% or more, the area fraction of the texture in the {118}//ND orientation is higher than the area fraction of the texture in the {111}//ND orientation, resulting in improved magnetism.

Specifically, the area fraction of the texture in the {118}//ND orientation may be 11 to 15%, and the area fraction of the texture in the {111}//ND orientation may be 5 to 10%.

The non-oriented electrical steel sheet according to the embodiment of the present invention may have an average grain size of 50 to 100 μm. In the above-described range, the magnetism of the non-oriented electrical steel sheet is more excellent. The grain size is calculated as (measured area÷number of grains)^0.5. The grain size may be measured based on a plane parallel to the rolling plane (ND plane), and may be measured within the base material 10. Specifically, the average grain size may be 60 to 90 μm.

In the embodiment of the present invention, by appropriately controlling the alloy components, the number of sulfides having a diameter of 100 nm or more among sulfides formed inside the base material may be three times or more the number of sulfides having a diameter of less than 100 nm. Specifically, it may be 3.3 to 5.0 times. By forming a large number of the coarse sulfides as described above, it is possible to suppress fine precipitates that hinder magnetic domain movement to contribute to the improvement of magnetism.

A thickness of the steel sheet may be 0.10 to 0.30 mm. When it has an appropriate thickness, the magnetism may be improved.

A difference between a thickness ($t_{center}$) of a center in a width direction of the steel sheet and a thickness ($t_{500}$) at a position away from 500 mm vertically from the center to an edge may be 10 μm or less. This is because, as will be explained in a manufacturing process to be described later, the reduction ratio in cold rolling is set high, and through this, it may contribute to improvement of shape quality and yield of a motor core manufactured with the non-oriented electrical steel sheet.

As described above, in the embodiment of the present invention, the optimal alloy composition is suggested, and the texture may be improved to improve the magnetism. Specifically, the iron loss ($W_{10/400}$) of the non-oriented electrical steel sheet may be 10.5 W/kg or less, and the magnetic flux density ($B_{50}$) thereof may be 1.65 T or more. The iron loss ($W_{10/400}$) is iron loss when a magnetic flux density of 1.0 T is induced at a frequency of 40 HZ. The magnetic flux density ($B_{50}$) is magnetic flux density induced in a magnetic field of 5000 A/m. Specifically, the iron loss ($W_{10/400}$) of the non-oriented electrical steel sheet may be 10.0 W/kg or less, and the magnetic flux density ($B_{50}$) thereof may be 1.66 T or more.

A manufacturing method of a non-oriented electrical steel sheet according to an embodiment of the present invention includes: hot-rolling a slab to manufacture a hot-rolled sheet; cold-rolling the hot-rolled sheet to manufacture a cold-rolled sheet; and final annealing the cold-rolled sheet.

First, the slab is heated.

The alloy components of the slab have been described in the alloy components of the above-described non-oriented electrical steel sheet, so duplicate descriptions thereof will be omitted. Since the alloy compositions are not substantially changed during the manufacturing process of the non-oriented electrical steel sheet, the alloy compositions of the non-oriented electrical steel sheet and the slab are substantially the same.

Specifically, the slab may include, in wt %, Si: 1.5 to 4.0%, Al: 0.1 to 1.5%, Mn: 0.05 to 1.5%, Sn: 0.015 to 0.1%, P: 0.005 to 0.05%, Ga: 0.001 to 0.004%, and Bi: 0.0005 to 0.003%, and the balance of Fe and inevitable impurities.

Other additional elements of the slab have been described in the alloy components of the non-oriented electrical steel sheet, so duplicate descriptions thereof will be omitted.

The slab may be heated before hot-rolling. The heating temperature of the slab is not limited, but the slab may be heated at 1200° C. or less. When the slab heating temperature is too high, precipitates such as AlN and MnS present in the slab are re-dissolved and then finely precipitated during hot-rolling and annealing, thereby inhibiting grain growth and reducing magnetism.

Next, the slab is hot-rolled to manufacture the hot-rolled sheet. A thickness of the hot-rolled sheet may be 2 to 2.3 mm. In the manufacturing of the hot-rolled sheet, a finish rolling temperature may be 800° C. or higher. Specifically, it may be 800 to 1000° C. The hot-rolled sheet may be wound at temperatures of 700° C. or less.

After the manufacturing of the hot-rolled sheet, hot-rolled-sheet-annealing the hot-rolled sheet may be further included. In this case, a temperature of the hot-rolled-sheet-annealing may be 850 to 1150° C. When the temperature of the hot-rolled-sheet-annealing is too low, the structure does not grow or finely grows, making it difficult to obtain a magnetically beneficial texture during the annealing after the cold rolling. When the annealing temperature is too high, magnetic grains may excessively grow, and surface defects of the plate may become excessive. The hot-rolled sheet annealing is performed in order to increase the orientation favorable to magnetism as required, and it may be omitted. The annealed hot-rolled sheet may be pickled.

Next, the hot-rolled sheet is cold-rolled to manufacture a cold-rolled sheet. The cold-rolling is finally performed to a thickness of 0.1 mm to 0.3 mm. In the cold-rolling, the reduction ratio may be adjusted to 85% or more. Specifically, the reduction ratio may be 85 to 95%. When the reduction ratio is too low, a thickness difference in the width direction of the steel sheet may occur.

Next, the cold-rolled sheet is finally annealed. In the process of annealing the cold-rolled sheet, the annealing temperature is not largely limited as long as it is a temperature generally applied to the non-oriented electrical steel sheet. Since the iron loss of the non-oriented electrical steel sheet is closely related to the grain size, it is suitable when it is 400 to 1000° C. In addition, the annealing time is 100 seconds or less, so it may be annealed for a short time.

The annealing atmosphere is an atmosphere including hydrogen ($H_2$) and nitrogen ($N_2$), in which it may be annealed. Specifically, it may be annealed in the atmosphere including 5 to 50 vol % of hydrogen and 95 to 50 vol % of nitrogen.

In the final annealing process, the average grain size may be 50 to 100 μm, and all (that is, 99% or more) of the processed structure formed in the cold rolling that is the previous step thereof may be recrystallized.

After the final annealing, an insulating film may be formed. The insulating film may be formed as an organic, inorganic, and organic/inorganic composite film, and it may be formed with other insulating coating materials. Hereinafter, the present invention will be described in more detail through examples. However, the examples are only for illustrating the present invention, and the present invention is not limited thereto.

Example 1

A slab was manufactured with components containing the following Table 1 and Table 2, and Cu:200 ppm, the balance Fe, and other inevitable impurities. This was heated at 1150° C. and hot-rolled at a finishing temperature of 830° C. to manufacture a hot-rolled sheet with a thickness of 2.3 mm. The hot-rolled hot-rolled sheet was annealed at 1030° C. for 100 seconds, and then cold-rolled to become thicknesses as shown in Table 3, and then recrystallized-annealed at 980° C. for 88 seconds.

For each specimen, oxide layer thicknesses, whether Formula 1 and Formula 2 are satisfied, whether the oxide layer includes Al, P, and Sn, average grain sizes, area fractions of {118}//ND and {111}//ND orientations, W10/400 iron loss, and B50 magnetic flux density is shown in Table 3 and Table 4.

The oxide layer thickness is an average value obtained by processing the specimen with FIB to have a smooth cross-section and measuring the thickness of the oxide layer at 10 or more points on the surface layer of the base material by imaging it at high TEM magnification. In this case, by performing area analysis of the chemical composition of the oxide layer on the surface of the base material by using the TEM-EDS measurement function, when Al, P, and Sn were simultaneously detected in 0.5 wt % or more, it was determined that the element was contained in the oxide layer. For the grain size, a cross section in the rolling vertical direction (TD direction) of the specimen was polished and then etched, and a sufficient area was photographed with an optical microscope so that 1500 or more grains were included, and it was calculated as (measured area÷number of grains)^0.5.

For the texture, the normal direction (ND direction) of the rolling surface of the specimen was measured by EBSD, the measurement area for each specimen was 100 mm² or more, and the step size of 2 μm was applied. V118 was the fraction of the measurement area in which the ND plane has an orientation parallel to the {118} plane in the total measurement area, V111 was the fraction of the measurement area in which the ND plane has an orientation parallel to the {111} plane in the total measurement area, and the same error angle of 5° was applied.

Regarding the magnetic characteristics such as the magnetic flux density or the iron loss, for each specimen, the specimen of 60 mm (width)×60 mm (length)×5 (number of pieces) was incised and was measured in the rolling direction and the vertical rolling direction with a single sheet tester to find an average value. In this case, W10/400 is iron loss when a magnetic flux density of 1.0 T is induced at a frequency of 400 Hz, and B50 is a magnetic flux density induced in a magnetic field of 5000 Nm.

TABLE 1

| Specimen number | Si (%) | Al (%) | Mn (%) | Sn (ppm) | P (ppm) | Ga (ppm) | Bi (ppm) |
|---|---|---|---|---|---|---|---|
| A1 | 3.2 | 0.9 | 0.3 | 211 | 115 | 4 | 15 |
| A2 | 3.2 | 0.9 | 0.3 | 1172 | 169 | 24 | 11 |
| A3 | 3.2 | 0.9 | 0.3 | 579 | 231 | 20 | 27 |
| A4 | 3.2 | 0.9 | 0.3 | 640 | 333 | 34 | 21 |
| B1 | 3.4 | 1 | 0.1 | 112 | 79 | 26 | 22 |
| B2 | 3.4 | 1 | 0.1 | 434 | 113 | 35 | 2 |
| B3 | 3.4 | 1 | 0.1 | 690 | 273 | 35 | 23 |
| B4 | 3.4 | 1 | 0.1 | 675 | 257 | 21 | 27 |
| C1 | 3.5 | 0.7 | 0.5 | 311 | 305 | 57 | 7 |
| C2 | 3.5 | 0.7 | 0.5 | 263 | 37 | 22 | 26 |
| C3 | 3.5 | 0.7 | 0.5 | 412 | 344 | 22 | 15 |
| C4 | 3.5 | 0.7 | 0.5 | 496 | 190 | 30 | 22 |
| D1 | 3.6 | 0.3 | 1 | 358 | 168 | 33 | 23 |
| D2 | 3.6 | 0.3 | 1 | 430 | 91 | 24 | 41 |
| D3 | 3.6 | 0.3 | 1 | 433 | 98 | 34 | 26 |
| D4 | 3.6 | 0.3 | 1 | 609 | 338 | 17 | 26 |
| E1 | 3.7 | 0.4 | 0.7 | 580 | 63 | 20 | 18 |
| E2 | 3.7 | 0.4 | 0.7 | 520 | 670 | 32 | 8 |
| E3 | 3.7 | 0.4 | 0.7 | 642 | 143 | 34 | 19 |
| E4 | 3.7 | 0.4 | 0.7 | 374 | 223 | 18 | 20 |
| F1 | 3.3 | 0.6 | 0.6 | 571 | 232 | 20 | 18 |
| F2 | 3.3 | 0.6 | 0.6 | 467 | 177 | 18 | 26 |
| F3 | 3.3 | 0.6 | 0.6 | 635 | 154 | 32 | 15 |
| F4 | 3.3 | 0.6 | 0.6 | 354 | 231 | 23 | 11 |

TABLE 2

| Specimen number | Ni (ppm) | C (ppm) | N (ppm) | S (ppm) | Ti (ppm) | Cr (ppm) | Mo (ppm) |
|---|---|---|---|---|---|---|---|
| A1 | 170 | 15 | 19 | 5 | 29 | 244 | 28 |
| A2 | 127 | 16 | 11 | 21 | 21 | 253 | 37 |
| A3 | 276 | 33 | 19 | 25 | 16 | 81 | 10 |
| A4 | 312 | 33 | 13 | 11 | 26 | 250 | 31 |
| B1 | 208 | 25 | 24 | 30 | 13 | 199 | 18 |
| B2 | 240 | 13 | 16 | 30 | 11 | 170 | 41 |
| B3 | 244 | 23 | 22 | 12 | 21 | 65 | 17 |
| B4 | 286 | 10 | 25 | 18 | 23 | 235 | 57 |
| C1 | 170 | 34 | 10 | 30 | 18 | 173 | 10 |
| C2 | 241 | 34 | 24 | 17 | 15 | 145 | 19 |
| C3 | 281 | 35 | 16 | 5 | 24 | 102 | 17 |
| C4 | 218 | 16 | 17 | 15 | 25 | 197 | 61 |
| D1 | 258 | 23 | 7 | 31 | 12 | 61 | 75 |
| D2 | 313 | 11 | 9 | 31 | 13 | 65 | 65 |
| D3 | 214 | 12 | 14 | 12 | 15 | 83 | 22 |
| D4 | 244 | 36 | 11 | 11 | 23 | 64 | 49 |
| E1 | 452 | 25 | 26 | 6 | 25 | 110 | 16 |
| E2 | 308 | 12 | 11 | 18 | 15 | 67 | 31 |
| E3 | 228 | 33 | 19 | 24 | 29 | 79 | 34 |
| E4 | 153 | 26 | 32 | 33 | 26 | 94 | 19 |
| F1 | 322 | 22 | 26 | 11 | 16 | 252 | 16 |
| F2 | 353 | 21 | 11 | 22 | 23 | 32 | 22 |
| F3 | 121 | 32 | 17 | 21 | 15 | 95 | 31 |
| F4 | 241 | 22 | 15 | 34 | 25 | 104 | 29 |

TABLE 3

| Specimen number | Thickness [mm] | Oxide layer thickness [μm] | Formula 1 | Formula 2 | Whether oxide layer contains Al, P, and Sn |
|---|---|---|---|---|---|
| A1 | 0.15 | 32 | ○ | ○ | X |
| A2 |  | 6 | ○ | X | ○ |
| A3 |  | 23 | ○ | ○ | ○ |
| A4 |  | 20 | ○ | ○ | ○ |
| B1 | 0.2 | 41 | ○ | ○ | X |
| B2 |  | 32 | ○ | ○ | X |
| B3 |  | 21 | ○ | ○ | ○ |
| B4 |  | 25 | ○ | ○ | ○ |
| C1 | 0.25 | 5 | ○ | ○ | ○ |
| C2 |  | 31 | ○ | ○ | X |
| C3 |  | 13 | ○ | ○ | ○ |
| C4 |  | 33 | ○ | ○ | ○ |
| D1 | 0.27 | 25 | ○ | X | X |
| D2 |  | 7 | ○ | X | ○ |
| D3 |  | 39 | ○ | ○ | ○ |
| D4 |  | 22 | ○ | ○ | ○ |
| E1 | 0.3 | 6 | ○ | ○ | ○ |
| E2 |  | 8 | ○ | ○ | ○ |
| E3 |  | 16 | ○ | ○ | ○ |
| E4 |  | 24 | ○ | ○ | ○ |
| F1 | 0.25 | 6 | X | ○ | ○ |
| F2 |  | 65 | X | ○ | ○ |
| F3 |  | 23 | ○ | X | X |
| F4 |  | 14 | ○ | ○ | ○ |

TABLE 4

| Specimen number | Grain size [pm] | $V_{118}$ [%] | $V_{111}$ [%] | W10/400 [W/kg] | B50 [T] | Remarks |
|---|---|---|---|---|---|---|
| A1 | 86 | 8 | 11 | 9.9 | 1.63 | Comparative example |
| A2 | 68 | 9 | 12 | 10 | 1.62 | Comparative example |
| A3 | 77 | 12 | 9 | 9.3 | 1.64 | Inventive example |
| A4 | 73 | 11 | 7 | 9.3 | 1.65 | Inventive example |
| B1 | 77 | 11 | 13 | 11.6 | 1.64 | Comparative example |
| B2 | 63 | 10 | 13 | 11.5 | 1.63 | Comparative example |
| B3 | 85 | 13 | 10 | 10 | 1.66 | Inventive example |
| B4 | 82 | 12 | 8 | 10.1 | 1.66 | Inventive example |
| C1 | 86 | 9 | 11 | 12.5 | 1.64 | Comparative example |
| C2 | 61 | 9 | 12 | 12.6 | 1.65 | Comparative example |
| C3 | 79 | 12 | 10 | 11.2 | 1.67 | Inventive example |
| C4 | 85 | 12 | 9 | 11 | 1.67 | Inventive example |
| D1 | 85 | 9 | 11 | 13.2 | 1.66 | Comparative example |
| D2 | 87 | 8 | 12 | 13.1 | 1.65 | Comparative example |
| D3 | 75 | 13 | 9 | 12 | 1.68 | Inventive example |
| D4 | 85 | 11 | 8 | 11.9 | 1.68 | Inventive example |
| E1 | 79 | 8 | 11 | 14.4 | 1.66 | Comparative example |
| E2 | 61 | 9 | 11 | 14.2 | 1.66 | Comparative example |
| E3 | 61 | 13 | 9 | 13.1 | 1.68 | Inventive example |
| E4 | 82 | 12 | 7 | 13.3 | 1.68 | Inventive example |
| F1 | 62 | 10 | 13 | 12.6 | 1.64 | Comparative example |
| F2 | 64 | 8 | 12 | 12.6 | 1.65 | Comparative example |
| F3 | 62 | 7 | 11 | 12.7 | 1.64 | Comparative example |
| F4 | 68 | 12 | 8 | 11.3 | 1.67 | Inventive example |

As shown in Table 1 to Table 4, in the case of A3, A4, B3, B4, C3, C4, D3, D4, E3, E4, and F4 of which alloy components and textures are appropriately controlled, it can be confirmed that the magnetism is excellent.

On the other hand, it can be confirmed that A1, A2, B1, B2, C1, C2, D1, D2, E1, E2, F1, F2, and F3 of which alloy components and textures are not appropriately controlled have inferior magnetism.

In addition, it can be confirmed that, in the case of A3, A4, B3, B4, C3, C4, D3, D4, E3, E4, and F4, the thickness of the oxide layer is properly formed, Al, P, and Sn in the oxide layer are properly concentrated, and the magnetism is excellent, while in the case of A1, A2, B1, B2, C1, C2, D1, D2, E1, E2, F1, F2, and F3, the thickness of the oxide layer is not properly formed, or Al, P, and Sn in the oxide layer are not properly concentrated, so that the magnetism is inferior.

Example 2

A slab was prepared with components including: Table 5 and Table 6, and C: 20 ppm, N: 20 ppm, Cr: 200 ppm, Mo: 20 ppm, and the balance of Fe and unavoidable impurities. This was reheated at 1170° C. and hot-rolled at a finishing temperature of 860° C. to manufacture hot-rolled sheets of various thicknesses so that it may be rolled at the cold reduction ratio shown in Table 7. The hot-rolled sheet was annealed at 1020° C. for 80 seconds and then cold-rolled to become respective thicknesses as shown in Table 7. This was final-recrystallization-annealed for the time shown in Table 7 at a maximum temperature of 960° C. to manufacture a coil having a width of 1100 mm.

Table 7 and Table 8 show the cold reduction ratio, the final annealing time, whether Formula 3 is satisfied, the grain size, the ratio of the number of coarse sulfides and micro-sulfides, the width direction thickness deviation, W10/400 iron loss, and B50 magnetic flux density for each specimen. The cold reduction ratio was calculated by using the formula "(Hot-rolled sheet thickness—Cold-rolled sheet thickness)/Hot-rolled sheet thickness", and the final annealing time means the time that passes through the section in which the atmosphere temperature is 400° C. or higher when annealing in a continuous annealing furnace. The ratio of the number of coarse sulfides and micro-sulfides means a value obtained by preparing a specimen by the TEM replica method and measuring the diameters and number of all sulfides with respect to an area of 2500 μm² or more and then dividing the number of sulfides with a diameter of 100 nm or more by the number of sulfides with a diameter of less than 100 nm. $t_{center}$–$t_{500}$ showed a difference between the central thickness measurement value in the width direction and the thickness measurement value at the center 500 mm position in the width direction. The magnetic characteristic was measured by using a single sheet tester by the same method as in Example 1.

TABLE 5

| Specimen number | Si (%) | Al (%) | Mn (%) | Sn (ppm) | P (ppm) | Ga (ppm) | Bi (ppm) |
|---|---|---|---|---|---|---|---|
| A5, A9 | 3.2 | 0.9 | 0.3 | 435 | 331 | 17 | 3 |
| A6, A10 | 3.2 | 0.9 | 0.3 | 624 | 352 | 26 | 24 |
| A7, A11 | 3.2 | 0.9 | 0.3 | 216 | 124 | 18 | 19 |
| A8, A12 | 3.2 | 0.9 | 0.3 | 380 | 340 | 30 | 26 |
| B5, B9 | 3.4 | 1 | 0.1 | 321 | 160 | 62 | 11 |
| B6, B10 | 3.4 | 1 | 0.1 | 324 | 128 | 18 | 53 |
| B7, B11 | 3.4 | 1 | 0.1 | 464 | 266 | 17 | 18 |
| B8, B12 | 3.4 | 1 | 0.1 | 239 | 165 | 27 | 21 |
| C5, C9 | 3.5 | 0.7 | 0.5 | 288 | 377 | 33 | 18 |
| C6, C10 | 3.5 | 0.7 | 0.5 | 705 | 272 | 7 | 13 |
| C7, C11 | 3.5 | 0.7 | 0.5 | 589 | 245 | 17 | 11 |
| C8, C12 | 3.5 | 0.7 | 0.5 | 425 | 331 | 24 | 14 |

TABLE 6

| Specimen number | Ni (PPm) | Cu (PPm) | Ti (PPm) | S (PPm) |
|---|---|---|---|---|
| A5, A9 | 296 | 53 | 23 | 9 |
| A6, A10 | 331 | 472 | 14 | 27 |
| A7, A11 | 336 | 125 | 26 | 23 |
| A8, A12 | 264 | 214 | 22 | 26 |
| B5, B9 | 288 | 201 | 25 | 31 |
| B6, B10 | 374 | 269 | 20 | 31 |
| B7, B11 | 273 | 33 | 21 | 23 |
| B8, B12 | 220 | 142 | 14 | 27 |
| C5, C9 | 263 | 12 | 23 | 16 |
| C6, C10 | 400 | 235 | 19 | 14 |
| C7, C11 | 385 | 238 | 26 | 7 |
| C8, C12 | 214 | 77 | 21 | 8 |

TABLE 7

| Specimen number | Thickness [mm] | Cold reduction ratio [%] | Final annealing time [sec] | Formula 3 | Grain size [μm] | $S_{\geq 100}$/$S_{<100}$ |
|---|---|---|---|---|---|---|
| A5 | 0.15 | 83 | 85 | ○ | 82 | 4.7 |
| A6 | | | | X | 46 | 2.7 |
| A7 | | | | ○ | 86 | 4.2 |
| A8 | | | | ○ | 68 | 4.8 |
| A9 | | 89 | | ○ | 77 | 3.7 |
| A10 | | | | X | 44 | 2.5 |
| A11 | | | | ○ | 61 | 4.9 |
| A12 | | | | ○ | 73 | 4.2 |
| B5 | 0.2 | 83 | 90 | ○ | 46 | 2.5 |
| B6 | | | | ○ | 43 | 2.8 |
| B7 | | | | ○ | 90 | 4.4 |
| B8 | | | | ○ | 91 | 4.3 |
| B9 | | 89 | | ○ | 43 | 2.7 |
| B10 | | | | ○ | 36 | 2.6 |
| B11 | | | | ○ | 65 | 4.3 |
| B12 | | | | ○ | 62 | 4.4 |
| C5 | 0.25 | 83 | 80 | X | 44 | 2.8 |

TABLE 7-continued

| Specimen number | Thickness [mm] | Cold reduction ratio [%] | Final annealing time [sec] | Formula 3 | Grain size [μm] | $S_{\geq 100}/S_{<100}$ |
|---|---|---|---|---|---|---|
| C6 | | | | ○ | 72 | 3.4 |
| C7 | | | | ○ | 83 | 3.6 |
| C8 | | | | ○ | 86 | 4.2 |
| C9 | | 89 | | X | 39 | 2.6 |
| C10 | | | | ○ | 84 | 3.6 |
| C11 | | | | ○ | 73 | 4.9 |
| C12 | | | | ○ | 71 | 3.7 |

TABLE 8

| Specimen number | $V_{118}$ [%] | $V_{111}$ [%] | $t_{center}$-$t_{500}$ [μm] | W10/400 [W/kg] | B50 [T] | Remarks |
|---|---|---|---|---|---|---|
| A5 | 8 | 12 | 14.2 | 10.2 | 1.62 | Comparative example |
| A6 | 7 | 14 | 13.7 | 10.1 | 1.63 | Comparative example |
| A7 | 14 | 7 | 13.6 | 9.6 | 1.65 | Comparative example |
| A8 | 13 | 8 | 12.9 | 9.4 | 1.65 | Comparative example |
| A9 | 9 | 13 | 12 | 10 | 1.63 | Comparative example |
| A10 | 7 | 12 | 7.9 | 10.1 | 1.62 | Comparative example |
| A11 | 13 | 8 | 7.4 | 9.3 | 1.65 | Inventive example |
| A12 | 13 | 6 | 5.1 | 9.4 | 1.65 | Inventive example |
| B5 | 6 | 12 | 13.5 | 11 | 1.63 | Comparative example |
| B6 | 9 | 13 | 12.4 | 11.2 | 1.63 | Comparative example |
| B7 | 12 | 7 | 13.5 | 10 | 1.66 | Comparative example |
| B8 | 14 | 7 | 13.2 | 10 | 1.66 | Comparative example |
| B9 | 8 | 13 | 6.2 | 11.3 | 1.64 | Comparative example |
| B10 | 8 | 12 | 8.8 | 11.1 | 1.63 | Comparative example |
| B11 | 13 | 8 | 6.7 | 10 | 1.66 | Inventive example |
| B12 | 12 | 6 | 8.5 | 9.9 | 1.66 | Inventive example |
| C5 | 7 | 12 | 12.5 | 12.5 | 1.65 | Comparative example |
| C6 | 9 | 14 | 12.8 | 12.4 | 1.64 | Comparative example |
| C7 | 12 | 6 | 13.4 | 11.4 | 1.67 | Comparative example |
| C8 | 12 | 7 | 12.1 | 11.4 | 1.67 | Comparative example |
| C9 | 9 | 13 | 8.3 | 12.5 | 1.65 | Comparative example |
| C10 | 6 | 12 | 11.9 | 12.5 | 1.64 | Comparative example |
| C11 | 13 | 8 | 8.6 | 11.2 | 1.67 | Inventive example |
| C12 | 14 | 6 | 5 | 11.3 | 1.67 | Inventive example |

Specimen numbers A11, A12, B11, B12, C11, and C12 all satisfied the range of the present invention in component content, micro-structure characteristic, and manufacturing method, so that the grain size, sulfide size, width direction thickness deviation, and magnetic characteristic were all excellent.

On the other hand, in the case of A5 to A8, B5 to B8, and C5 to C8, the width direction thickness deviation was too high because the reduction ratio was not sufficient, and in the case of A9 and C10, the thickness deviation was high even though the reduction ratio was sufficiently high due to the low content of Ga and Bi, so that the sheet shape was not good. In A6, A10, C5, and C9, the sulfide was not sufficiently coarsened because the content of Cu was outside the range of the present invention, so that the grain size was small and the magnetic characteristic was not good. B5, B6, B9, and B10 had excessively high content of Ga or Bi, which caused surface defects due to excessive segregation, sulfide refinement, and deterioration of grain growth, resulting in poor magnetic characteristics.

The present invention may be embodied in many different forms, and should not be construed as being limited to the disclosed embodiments. In addition, it will be understood by those skilled in the art that various changes in form and details may be made thereto without departing from the technical spirit and essential features of the present invention. Therefore, it is to be understood that the above-described embodiments are for illustrative purposes only, and the scope of the present invention is not limited thereto.

The invention claimed is:

1. A non-oriented electrical steel sheet including, in wt %, C: 0.005 wt % or less, Si: 1.5 to 4.0%, Al: 0.1 to 1.5%, Mn: 0.05 to 1.5%, Sn: 0.015 to 0.1%, P: 0.005 to 0.05%, Ga: 0.001 to 0.004%, and Bi: 0.0005 to 0.003%, and the balance of Fe and inevitable impurities,
    wherein an area fraction of texture in a {118}//ND orientation is higher than that of texture in a {111}//ND orientation.

2. The non-oriented electrical steel sheet of claim 1, further comprising
    Cr: 0.005 to 0.03 wt %,
    wherein the non-oriented electrical steel sheet satisfies Formula 1:

$$0.005 \leq [Cr] \leq 0.03 \times [Al] \quad \text{[Formula 1]}$$

(in Formula 1, [Cr] and [Al] are a content (wt %) of Cr and Al in the steel sheet, respectively).

3. The non-oriented electrical steel sheet of claim 1, further comprising Mo: 0.001 to 0.01 wt % and Ni: 0.005 to 0.04 wt %,
    wherein the non-oriented electrical steel sheet satisfies Formula 2:

$$10 \times [Mo] \leq ([Sn]+[P]) \leq 4 \times [Ni] \quad \text{[Formula 2]}$$

(in Formula 2, [Mo], [Sn], [P], and [Ni] represent a content (wt %) of Mo, Sn, P, and Ni in the steel sheet, respectively).

4. The non-oriented electrical steel sheet of claim 1, further comprising Cu: 0.001 to 0.05 wt %, S: 0.005 wt % or less, and Ti: 0.005 wt % or less,
    wherein the non-oriented electrical steel sheet satisfies Formula 3:

$$0.5 \leq [Cu]/([Ti]+[S]) \leq 7.5 \quad \text{[Formula 3]}$$

(in Formula 3, [Cu], [Ti], and [S] represent a content (wt %) of Cu, Ti, and S in the steel sheet, respectively).

5. The non-oriented electrical steel sheet of claim 1, wherein
    among sulfides formed inside a base material, the number of sulfides with a diameter of 100 nm or more satisfies three or more times the number of sulfides of less than 100 nm.

6. The non-oriented electrical steel sheet of claim 1, further comprising
    N: 0.005 wt % or less.

7. The non-oriented electrical steel sheet of claim 1, wherein
    an oxide layer is present in an inner direction from a surface of the electrical steel sheet, and a thickness of the oxide layer is 10 to 50 nm.

8. The non-oriented electrical steel sheet of claim 7, wherein
    the oxide layer includes O: 40 to 70 wt %, Al: 25 to 55 wt %, P: 0.01 to 0.1 wt %, and Sn: 0.01 to 0.1 wt %, and the balance of Fe and inevitable impurities.

9. The non-oriented electrical steel sheet of claim 1, wherein
    an average grain size is 50 to 100 μm.

10. The non-oriented electrical steel sheet of claim 1, wherein
    the non-oriented electrical steel sheet has a thickness of 0.10 to 0.30 mm.

11. The non-oriented electrical steel sheet of claim 1, wherein
   a difference between a thickness ($t_{center}$) of a center in a width direction of the steel sheet and a thickness ($t_{500}$) at a position away by 500 mm vertically from the center to an edge is 10 μm or less.

12. A manufacturing method of a non-oriented electrical steel sheet, comprising:
   hot-rolling a slab including, in wt %, C: 0.005% or less, Si: 1.5 to 4.0%, Al: 0.1 to 1.5%, Mn: 0.05 to 1.5%, Sn: 0.015 to 0.1%, P: 0.005 to 0.05%, Ga: 0.001 to 0.004%, and Bi: 0.0005 to 0.003%, and the balance of Fe and inevitable impurities to manufacture a hot-rolled sheet;
   cold-rolling the hot-rolled sheet at a reduction ratio of 85% or more to manufacture a cold-rolled sheet; and
   final annealing the cold-rolled sheet,
   wherein after final annealing, an area fraction of texture in a {118}//ND orientation is higher than that of texture in a {111}//ND orientation.

13. The manufacturing method of the non-oriented electrical steel sheet of claim 12, further comprising
   after the manufacturing of the hot-rolled sheet, annealing the hot-rolled sheet at a temperature of 850 to 1150° C.

14. The manufacturing method of the non-oriented electrical steel sheet of claim 12, wherein
   the final annealing is performed for 100 seconds or less in an atmosphere including hydrogen ($H_2$) and nitrogen ($N_2$) and at a temperature ranging from 400 to 1000° C.

* * * * *